Aug. 7, 1956 D. VARADY 2,757,911
MORTAR, PLASTER AND CEMENT MIXER
Filed March 21, 1955 2 Sheets-Sheet 1

Dominic Varady
INVENTOR.

BY

Aug. 7, 1956     D. VARADY     2,757,911
MORTAR, PLASTER AND CEMENT MIXER
Filed March 21, 1955     2 Sheets-Sheet 2
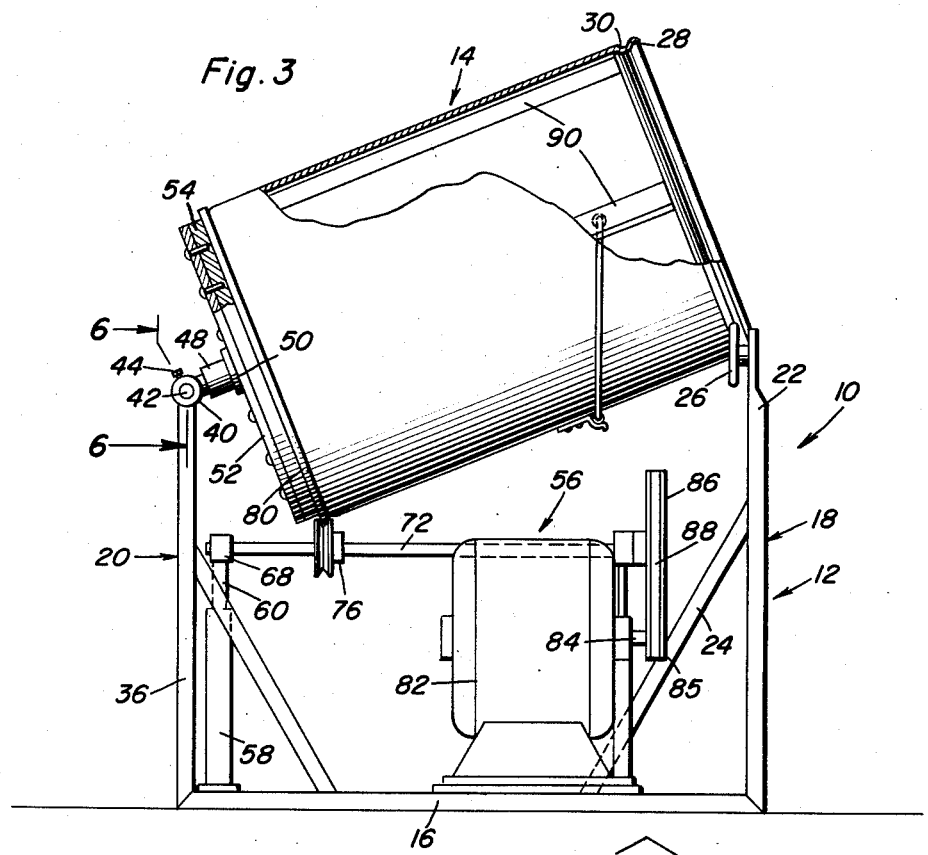
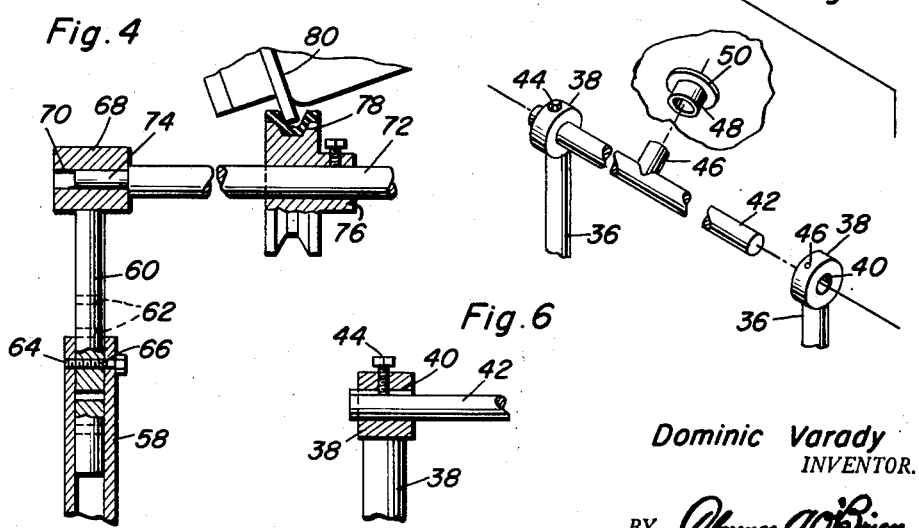
Dominic Varady
INVENTOR.

United States Patent Office 2,757,911
Patented Aug. 7, 1956

2,757,911

MORTAR, PLASTER, AND CEMENT MIXER

Dominic Varady, Keokuk, Iowa

Application March 21, 1955, Serial No. 495,581

1 Claim. (Cl. 259—177)

The present invention relates to a mixing apparatus of the type utilized to mix mortar, cement, plaster, paint and similar materials.

The primary object of the present invention is in the provision of a mixing apparatus which utilizes as the mixing drum thereof a conventional bucket which is removably and drivingly supported on the apparatus so that as the contents of one bucket are mixed, the bucket may be removed for use of the contents while a second bucket is placed on the mixing apparatus for mixing the contents thereof.

A highly important object of the invention, ancillary to the preceding object, is in the provision of a mixing apparatus which utilizes a conventional bucket as the mixing drum for the apparatus particularly adapting the apparatus for use by the home craftsman.

A further object of the invention, ancillary to the preceding objects is in the provision of a small, compact, inexpensive apparatus which is inexpensive to manufacture and efficient and durable in use.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 3 is a side elevational view of the mixing apparatus removably and rotatably supporting a bucket thereon;

Figure 4 is a detail view with certain parts being shown in cross-section for clarity of detail of a means whereby the bucket is rotated on the apparatus;

Figure 1:
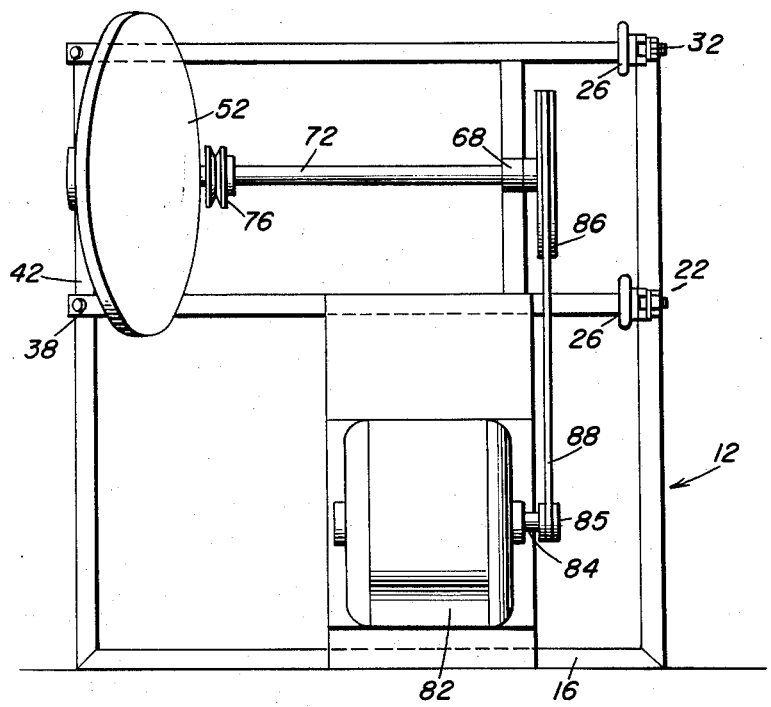
Figure 1 is a top elevational view of a mixing apparatus constituting the invention.

Figure 5 is an exploded detail view of the means whereby the plate for supporting the bottom of the bucket constituting a portion of the apparatus; and Figure 6 is a cross-sectional view taken substantially along the plane of section line 6—6 of Figure 3 of a portion of the means for supporting the bucket bottom engaging plate of the apparatus whereby the angle of incidence of this plate may be varied to support a bucket at varying inclinations to the horizontal.

Referring to the drawings in detail, the mixing apparatus constituting the present invention is designated in its entirety by the numeral 10 and comprises essentially a supporting structure 12 for drivingly, rotatably and removably supporting a conventional bucket 14 in an inclined position thereon for mixing the contents thereof.

The supporting structure 12 consists of a base 16 having front and rear supports 18 and 20, respectively, rising therefrom.

The front support 18 rising from the base 16 comprises a pair of parallel, transversely spaced supporting posts 22. Diagonal braces 24 are attached at their upper ends to intermediate portions of the posts 22 and at their lower ends to base 16 to stiffen the posts.

At their upper ends, the posts 22 carry rotatable wheels or rollers 26 which are rotatably journaled on an axis parallel to the base 16 and extending toward the rear support 20. The rollers 26 engage the side wall of the bucket 14 disclosed between the posts 22 adjacent the rim 28 of the bucket, preferably in the groove 30 adjacent the rim 28 extending circumferentially around the bucket side wall.

Figure 2:
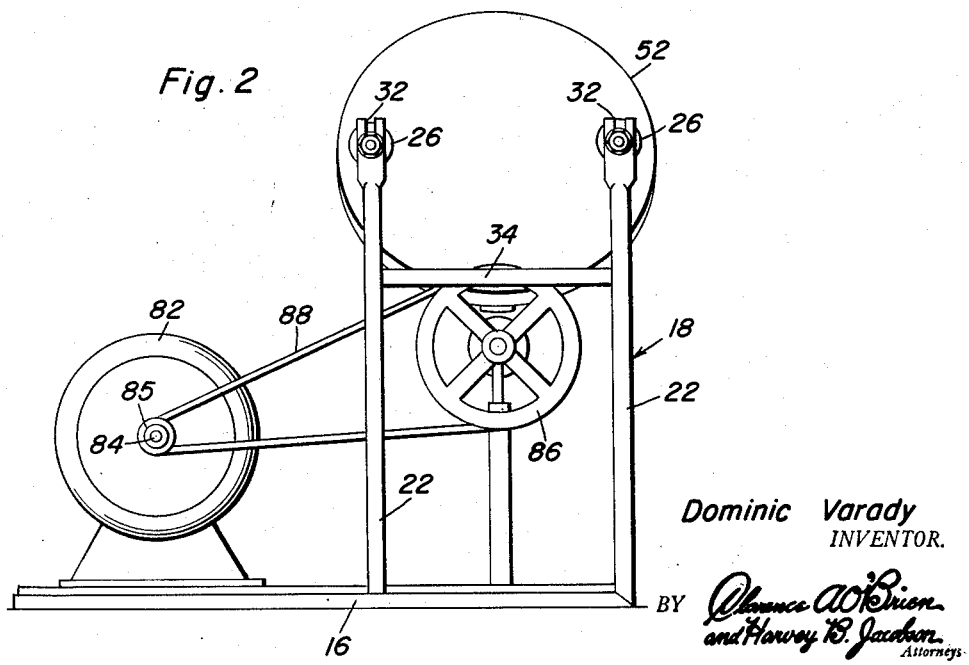
Figure 2 is a rear elevational view of the mixing apparatus.

As will be noted particularly from an examination of Figure 2, the upper ends of the posts 22 are provided with vertically opening slots 32 whereby the rollers 26 may be removed for cleaning, or replacement or for the mounting of different sized rollers as desired. Cross brace 34 extending between the posts and connecting at its ends thereto serve in conjunction with the diagonal braces 24 to stiffen the posts 22.

The rear support 20 constitutes a pair of parallel, transversely spaced, upstanding posts 36. To the upper ends of the posts 36 are secured bearings in the form of collars 38, the bores 40 of the collars 38 being aligned with one another. Shaft 42 extends between the posts 36 and has the ends thereof rotatably journaled in the bores 40 of the bearing collars 38. Setscrews 44 threading through transverse apertures 46 in the collars 38 retain the shaft 42 in selected, adjusted rotated positions.

Intermediate its ends, the shaft 42 is provided with a radially outwardly projecting boss 46 upon which is rotatably journaled in concentric relation thereto a tubular boss 48 which is fixedly attached by means of the flanged coupling 50 to the center of disk 52, which disk is adapted to engage the bottom of a bucket. To the forward or front face of the disk 52 a base plate 54 of any suitable material may be bolted or nailed or otherwise secured as desired.

With the construction of the forward and rear supports 18 and 20, the apparatus is designed to rotatably support a variety of sized buckets and to vary the angle of incidence from the horizontal of each bucket as it is supported on the apparatus.

To drivingly revolve the bucket 14 supported on the apparatus, suitable driving means 56 is provided.

The driving means 56 includes a pair of upstanding, longitudinally spaced tubular supporting posts 58 disposed between the front and rear supports 18 and 20. The posts 58 have extensible upper end portions 60 projecting therefrom, the upper end portions 60 having longitudinally spaced transverse bores 62 therethrough and the upper end portions of the tubular posts 58 having diametrically opposite apertures 64 therethrough. Fasteners 66 extending through the transversely disposed apertures 64 of each tubular post 58 are received in a selected transverse bore 62 of each longitudinal extension 60 to vary the over-all height of each of the tubular posts 58.

Bearing collars 68 having bores 70 therethrough are mounted on the upper ends of extensible sections 60 of the tubular posts 58. The bars 70 of the collars 68 are in longitudinal alignment with one another and a driven shaft 72 has the reduced end portions 74 thereof rotatably journaled in the bearings 68.

Intermediate the ends thereof, shaft 72 has mounted thereon a suitable driven element in the form of a pulley wheel or the like 76. The grooved periphery of the pulley wheel 76 may be provided with a suitable non-slip material such as rubber or the like as designated at 78. The bottom edge 80 of the bucket 14 is frictionally, drivingly supported in the peripheral groove of the pulley wheel 76, this pulley wheel being in turn fixedly mounted on the shaft 72 for rotation therewith.

By virtue of the extensibility of the tubular posts 58, of course the pulley wheel 76 may be adjusted to engage the bottom rim or edge 80 of varying sized buckets 14 to revolve the buckets.

To drive the driven shaft and pulley 76, a suitable motor 82 is mounted on the base 16 to one side of the front and rear supports 18 and 20. To the drive shaft 84 of the motor 82 is attached a suitable pulley wheel 85 or the like which cooperates with a large pulley wheel 86 fixed to one end of the shaft 72 through the medium of an endless driving belt 88 to rotate the driven shaft 72 in response to operation of the motor. Of course, any equivalent gear drive, chain drive or the like could be utilized if desired.

Preferably, each bucket 14 to be utilized with the apparatus 10 is provided with longitudinally extending ribs 90 on the inner surface thereof which may be simply angle iron members riveted, bolted or welded or otherwise secured therein, with one leg of each of the angle members forming a fin or mixing rib to agitate the material within the bucket.

The material to be mixed is placed in the bucket 14 and the driving means 56 actuated to revolve the bucket 14 and mix the contents thereof. When the contents have been mixed, the bucket 14 is simply removed from the apparatus and taken to the point of distribution for use of the contents while at the same time, a second bucket 14 may be put in place to mix the contents thereof while the contents of the first bucket are being used.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the appended claim.

What is claimed as new is as follows:

An apparatus for removably supporting a bucket and revolving the same to mix the contents thereof, said apparatus comprising longitudinally spaced front and rear supports, means carried by said front support for rotatably supporting the side wall of a bucket, means carried by said rear support for engaging the bottom of a bucket, driven means carried by said supporting structure between said front and rear supports for frictionally supporting the bottom edge of a bucket, means for driving said driven means for causing a bucket carried by said supporting structure to rotate, said rear support including a transversely extending shaft, said bottom engaging means comprising a plate rotatably carried by an intermediate portion of said shaft, bearings rotatably journaling the ends of said transversely extending shaft and means carried by said supporting structure adjustably retaining said transversely extending shaft in selected positions to vary the angle of incidence of said plate.

References Cited in the file of this patent
UNITED STATES PATENTS

| | | |
|---|---|---|
| 1,370,898 | Middlemiss | Mar. 8, 1921 |
| 2,510,858 | Black | June 6, 1950 |
| 2,599,852 | McClain | June 10, 1952 |